(12) United States Patent
Vittal Viveganandhan et al.

(10) Patent No.: US 10,992,965 B2
(45) Date of Patent: Apr. 27, 2021

(54) STORAGE SYSTEM FOR RECORDING AND RETRIEVING DATA COPY FOR MULTIPLE USERS

(71) Applicant: Synamedia Limited, Staines (GB)

(72) Inventors: Mahesh Chakravarthy Vittal Viveganandhan, Cupertino, CA (US); Hoi-tauw Jozef Chou, San Ramon, CA (US); Gowdish Kumaraswamy, Milipitas, CA (US); David Stuart Morgan, Apex, NC (US); Clint Ricker, Lawrenceville, GA (US); Ivan V. Legrand, Haddonfield, NJ (US)

(73) Assignee: Synamedia Limited, Middlesex (GB)

( * ) Notice: Subject to any disclaimer, the term of this patent is extended or adjusted under 35 U.S.C. 154(b) by 169 days.

(21) Appl. No.: 15/288,007

(22) Filed: Oct. 7, 2016

(65) Prior Publication Data

US 2017/0102890 A1    Apr. 13, 2017

Related U.S. Application Data

(60) Provisional application No. 62/239,379, filed on Oct. 9, 2015, provisional application No. 62/239,373, filed on Oct. 9, 2015.

(51) Int. Cl.
*H04N 21/21*     (2011.01)
*H04N 21/218*   (2011.01)
(Continued)

(52) U.S. Cl.
CPC ....... *H04N 21/2181* (2013.01); *G06F 16/955* (2019.01); *H04N 21/232* (2013.01);
(Continued)

(58) Field of Classification Search
CPC ....... H04N 21/44222; H04N 21/26258; H04N 21/274; H04N 21/2747; H04N 21/4325; H04N 21/44008; H04N 21/4583; H04N 21/472; H04N 21/47202; H04N 21/47214; H04N 21/47217; H04N 21/6125; H04N 21/231; G06F 21/6218; G06F 21/10; G06F 17/30828; G06F 11/1451
See application file for complete search history.

(56) References Cited

U.S. PATENT DOCUMENTS

8,156,090 B1 *    4/2012   Curles ............... G06F 16/164
                                                          707/694
2012/0284765 A1 * 11/2012  Killick ............... H04N 21/274
                                                          725/111
(Continued)

*Primary Examiner* — Reginald G Bragdon
*Assistant Examiner* — Thanh D Vo
(74) *Attorney, Agent, or Firm* — Fernando & Partners, LLP (57) ABSTRACT

In one embodiment, a method includes receiving a stored copy request indicating data and including a request identifier, scheduling publication of the data to an object store, and sending a subscription request indicating the data and the request identifier to the object store. In another embodiment, a method includes receiving a publication request indicating data to be copied, wherein the publication request is a recording request indicating a channel and a timespan, receiving one or more subscription requests for the data, receiving the data, and generating a copy of the data for each subscription request.

20 Claims, 7 Drawing Sheets

(51) Int. Cl.
*G06F 16/955* (2019.01)
*H04N 21/8355* (2011.01)
*H04N 21/231* (2011.01)
*H04N 21/2343* (2011.01)
*H04N 21/845* (2011.01)
*H04N 21/232* (2011.01)
*H04N 21/239* (2011.01)
*H04N 21/2747* (2011.01)
*G06F 16/71* (2019.01)

(52) U.S. Cl.
CPC ... *H04N 21/2393* (2013.01); *H04N 21/23103* (2013.01); *H04N 21/23113* (2013.01); *H04N 21/23439* (2013.01); *H04N 21/2747* (2013.01); *H04N 21/8355* (2013.01); *H04N 21/8456* (2013.01); *G06F 16/71* (2019.01)

(56) References Cited

U.S. PATENT DOCUMENTS

| | | | | |
|---|---|---|---|---|
| 2012/0321278 A1* | 12/2012 | Walker | ............... | H04N 21/274 386/238 |
| 2014/0157324 A1* | 6/2014 | Mao | ............... | G06F 17/301 725/54 |
| 2015/0067736 A1* | 3/2015 | Whitten | ............... | H04N 21/458 725/46 |

* cited by examiner

STORAGE SYSTEM FOR RECORDING AND RETRIEVING DATA COPY FOR MULTIPLE USERS

CROSS-REFERENCES TO RELATED APPLICATIONS

This application claims priority to U.S. Provisional Patent App. Nos. 62/239,373 and 62/239,379, both filed Oct. 9, 2015, and both hereby incorporated by reference in their entirety.

TECHNICAL FIELD

The present disclosure relates generally to storage systems, and in particular, to systems, methods and apparatuses enabling distributed storage of data for multiple users.

BACKGROUND

The ongoing development, maintenance and expansion of storage systems often involves providing storage of data for multiple users. As the number of users increases, the amount of signaling, bandwidth used, and metadata stored increases, degrading the efficiency of the storage system.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for efficiently storing data for multiple users. For example, in some implementations, a method includes receiving a stored copy request indicating data and including a request identifier, scheduling publication of the data to an object store, and sending a subscription request indicating the data and the request identifier to the object store.

As another example, in some implementations, a method includes receiving a publication request indicating data to be copied, wherein the publication request is a recording request indicating a channel and a timespan, receiving one or more subscription requests for the data, receiving the data, and generating a copy of the data for each subscription request.

Example Embodiments

When streaming media content for consumption by multiple users is received by a storage system, policies may indicate that a unique copy be stored for consumption by each individual user or that a single common copy be stored for consumption by any of the users. Such policies may be based on legal requirements associated with the content, limitations of the storage system (e.g., available storage space), or other factors.

Storing a unique copy of streaming media content for each user presents a number of challenges beyond the storage space used in storing multiple copies of the same data. For example, in various implementations, a storage system can store a number of copies in an object store by sending a respective number of PUT commands to write the content to the object store a number of times. The large number of PUT commands increases signaling overhead. Similarly, in various implementations, a storage system can store a number of copies in an object store by sending a copy to the object store a respective number of times. The large number of times transporting the same data increases the transport overhead. Further, storing multiple copies of the same data creates a sizeable amount of metadata that must be managed.

Although policies may dictate that the challenge of storing multiple copies of the same data cannot be avoided, other challenges associated with storing a unique copy of streaming media content for each user can at least be mitigated.

Various implementations described herein employ a concept referred to as fanning out, where a single object is pushed once to the object store and stored uniquely multiple times. In some embodiments, a client sends one or more subscription messages to the object store with instructions to subscribe to changes to a particular namespace and one or more respective destination namespaces. The subscription can be bound by pattern matching on headers for time ranges, message index, etc. The client publishes data to the particular namespace. In response, the object store creates unique objects with identical object names under each destination namespace, so as long as the header filtering mechanism passes.

In the context of cloud recording, for each recording, a recorder signals the object store to subscribe to a particular channel namespace with a destination namespace of the recording content identifier with specified start and end times. The recorder then pushes the video segments associated with the channel to the object store, which fans out the segments under each recording content identifier's namespace.

In various implementations, such as cDVR (cloud digital video recorder) recording, there is a constant stream of objects that are placed into an object storage from a linear source. Along with the media object, some form of metadata is stored, such as a sequence number or timestamp. Users interested in storing content and viewing it at a later time can indicate interest in the objects (e.g., streaming media content) by sending a subscribe message indicating specifics around the interest in the metadata, such as a range of sequence numbers or timestamps. As objects are put into the object store, they are duplicated into appropriate publish locations, based on the subscription messages that have been received. Upon the need to playback this content (a recording), the object store takes care of tracking what objects are to be collected as part of a given interest group, as well as associated metadata.

Thus, the ability to fan out objects (e.g., the replication of streaming media content as in the operation of unique copy cDVR systems or the replication of pointers to a single object as in the operation of common copy cDVR systems) is abstracted away from the external systems that use this invention. By reorganizing the individual functions as described below, a more efficient, flexible and unique approach to fanning out objects is provided.

Figure 1:
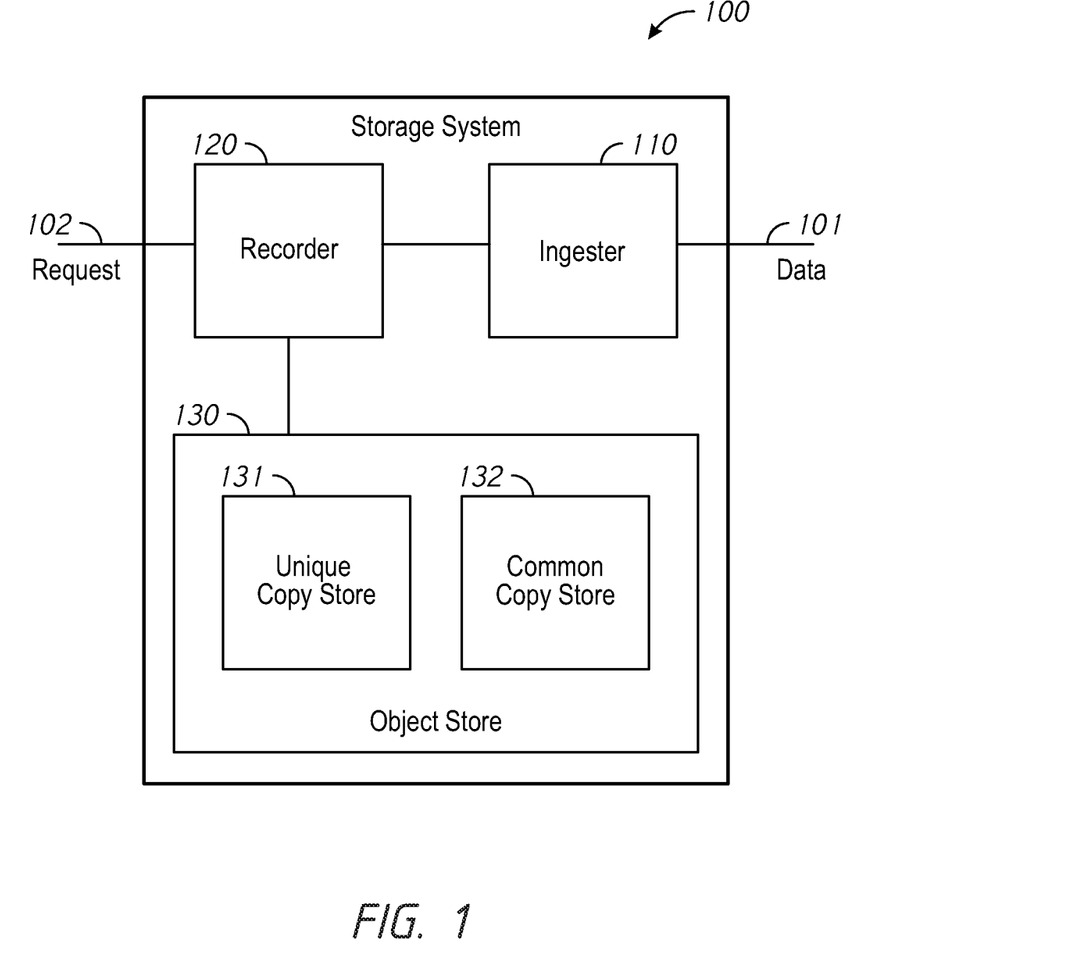
FIG. 1 is a block diagram of a storage system in accordance with some implementations.

FIG. 1 is a block diagram of a storage system 100. While certain specific features are illustrated, those of ordinary skill in the art will appreciate from the present disclosure that various other features have not been illustrated for the sake of brevity and so as not to obscure more pertinent aspects of the example implementations disclosed herein. To that end, the storage system 100 includes an ingester module 110 that receives data 101, a recorder module 120 that receives requests 102 to store the data 101 for a user, and an object store 130 that stores the data 101. The object store 130 includes a unique copy store 131 that stores a unique copy of the data 101 for each requesting user and a common copy store 132 that stores a common copy of the data 101 that is shared between requesting users.

Each of the modules 110, 120, 130 of the storage system can be implemented on the same or separate computing devices. In some implementations, the object store 130 can be a distributed object store including multiple computing devices networked over multiple locations.

In some implementations, the storage system 100 is configured to store video data associated with multicast (e.g., broadcast) content and, thus, acts as a digital video recorder (DVR). As both the data 101 and the requests 102 can be received over a network, the storage system 100 can function as a cloud-based DVR (cDVR).

Figure 2:
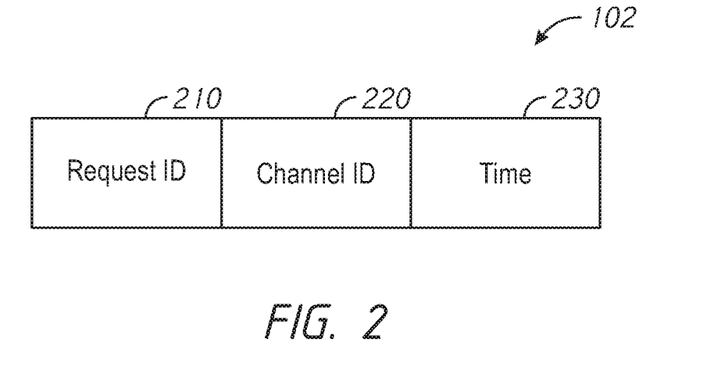
FIG. 2 is a block diagram of a recording request in accordance with some implementations.

As an example, a user can use the storage system 100 to record a television program within the storage system and watch the television program at a time later than the broadcast time. To that end, the recorder module 120 receives a recording request 102 from a user (optionally via a scheduling module) indicating that the user desires to record a particular television program. As shown in FIG. 2, the recording request 102 can include a recording request identifier (ID) 210, a channel ID 220, and temporal data 230 indicative of a time span of the recording.

The recording request ID 210 (referred to as a "request ID") can be a unique identifier that is different for each recording request. For example, the request ID 210 can be a UUID (universally unique identifier). In some implementations, the request ID 210 includes a user ID or, at least, indicates a particular user or user device (such as a set-top box).

The channel ID 220 can be an identifier that indicates a broadcast channel or sub-channel (also referred to as profiles). In general, the channel ID can identify the source of the data to be stored from among multiple sources. In some implementations, a broadcast channel can include sub-channels with multiple versions of the same broadcast. For example, the broadcast channel can include sub-channels (also referred to as channels) with video data at different bitrates or with different audio/subtitles. Thus, in some implementations, the channel ID 220 indicates a broadcast channel and the recording request 102 further includes data indicating the sub-channel or profile. In some implementations, the channel ID 220 indicates the sub-channel or profile.

In various implementations, the temporal data 230 can indicate the time span of the recording in a variety of ways. In some implementations, the temporal data 230 indicates a start time and an end time of the recording. In some implementations, the temporal data 230 indicates a start time and a recording length of the recording. In some implementations, the temporal data 230 indicates one or more programming slots (e.g., 8:00 pm to 8:30 pm and 8:30 pm to 9:00 pm) and the recorder module 120 determines the time span of the recording based on the programming slot.

In response to receiving the recording request 102, the recording module 120 instructs the ingester module 110 to receive (or retrieve) data 101 from the indicated channel (or sub-channel) during the time span and return the data 101 to the recorder module 120. When received from the ingester module 110, the recorder module 120 stores the data 101 in the object store 130 for later access for the user.

When multiple users submit requests to store the same data (e.g., record the same content), the recorder module 120 can handle the multiple requests in a number of ways to improve efficiency of the storage system 100. For example, the recorder module 120 can receive a first recording request (having a first request ID, a channel ID, and temporal data) and a second recording request (having a second request ID, the same channel ID, and the same, or at least overlapping, temporal data).

In some implementations, the recorder module 120 receives the data from the ingester module 110 and, for each recording request, instructs the object store 130 to store a unique copy of the data as a separate object in the unique copy store 131. For example, the recorder module 120 can submit a first PUT command to the object store 130 including the data and can further submit a second PUT command to the object store 130 including the second request ID and the data. The recorder module 120 can store metadata associating the first request ID with the object created by the first PUT command and associating the second request ID with the object created by the second PUT command.

However, such implementations may be inefficient for large numbers of recordings. Such implementations include multiple PUT commands from the recorder module 120 increasing the overhead of the signaling. Such implementations also include the recorder module 120 pushing identical data to the object store 130 multiple times, inefficiently using network bandwidth and increasing the overhead of transport. Further, creation of a large number of objects can create a sizable amount of metadata to be managed by the recorder module 120.

Thus, in some implementations, the recorder module 120 receives the data from the ingester module 110 and instructs the object store 130 to store a common copy of the data as a single object in the common copy store 132. The recorder module 120 can store metadata associating the first request ID with the object created by the PUT command and associating the second request ID with the same object.

In some implementations, the recorder module 120 handles the multiple requests for the same data using a "PUBSUB" modality. In response to a recording request with a channel ID and temporal data, the recorder module 120 publishes ("PUB") the indicated channel for the indicated time span to a source namespace in the object store 130 and instructs the object store 130 to subscribe ("SUB") a destination namespace associated with the request ID in the object store 130 to the source namespace.

As an example, in response to the first recording request, the recorder module 120 determines that it is not publishing the data associated with the indicated channel and time space. Thus, the recorder module 120 schedules publication of the data associated with the indicated channel and time span. For example, the recorder module 120 can instruct the ingester module 110 to receive (or retrieve) the data from the indicated channel during the time space and forward it to the recorder module 120. Further, the recorder module 120 can instruct the object store 130 to generate a source namespace to receive the data from the recorder module 120 when the recorder module 120 receives it from the ingester module 110. The recorder module 120 then instructs the object store 130 to generate a first destination namespace associated with the first request ID and to subscribe the first destination namespace to the source namespace.

In response to receiving the second recording request, the recorder module 120 determines that it is publishing the data associated with the indicate channel and time space. Thus, the recorder module 120 simply instructs the object store 130 to generate a second destination namespace associated with the second request ID and to subscribe the second destination namespace to the source namespace.

When the recorder module 120 receives the data from the ingester module 110, the recorder module 120 publishes the data to the source namespace on the object store 130. Because the source namespace has changed, the subscribed namespaces are also changed by the object store 130.

For each object of the data that is posted to the source namespace, the object store 130 creates a unique copy of the object in the unique copy store 131 under each destination namespace. In some implementations, the unique objects are created with identical object names. In some implementations, the subscription includes a filtering mechanism and only objects matching criteria (e.g., within a time range or having a particular message index) are copied from the source namespace to the destination namespace. Thus, the object store 130 fans out the received data to the subscribed namespaces.

Thus, in PUBSUB implementations, the object store 130 generates multiple copies of data for multiple recording requests from a single received copy. In contrast, in other implementations discussed above, the recorder module 130 submits multiple copies of the data to the object store for multiple recording requests. Thus, in PUBSUB implementations, the amount of signaling and bandwidth used is reduced.

Figure 3:
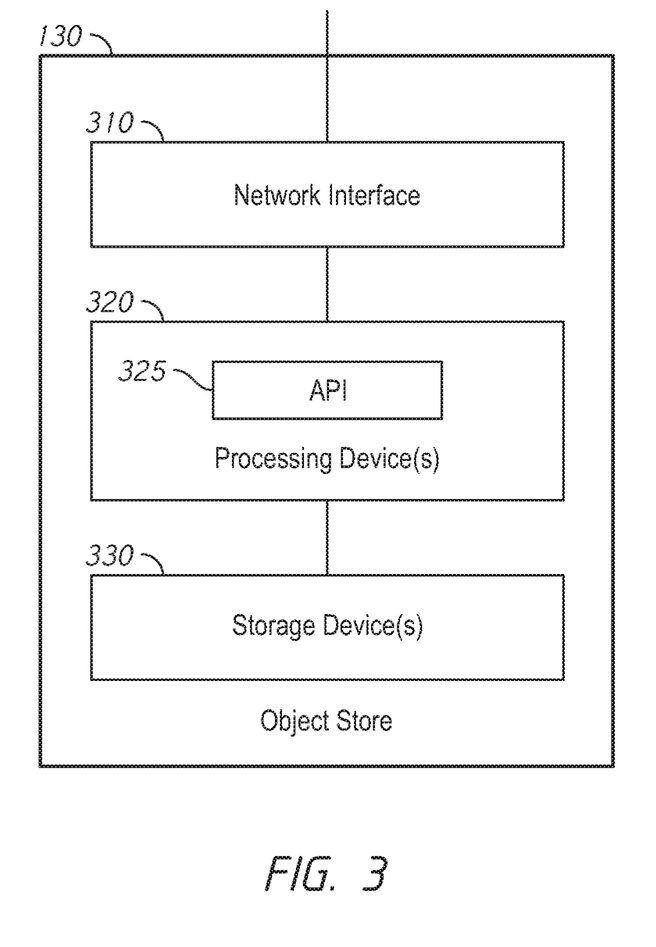
FIG. 3 is a block diagram of an object store in accordance with some implementations.

FIG. 3 is a block diagram of an object store 130 in accordance with some implementations. The object store 130 include a network interface 310 configured to receive commands and data (e.g., from the recorder module 120). The object store 130 includes one or more processing devices 320 that provide an API 325 (application programming interface) via the network interface 310. The object store 130 further includes one or more storage devices 330 for storing the received data and/or associated metadata.

The API 325 is configured to receive publication requests and subscription requests from the recorder module 120. However, performance of the requested tasks (e.g., by the processing device 320) can be performed in any of a number of ways. In some implementations, as described above, the object store 130 utilizes source namespaces associated with channels and times and destination namespaces associated with request IDs. In some implementations, the object store 130 can generate multiple copies of the received data (in the form of one or more objects) in other ways.

Figure 4A:
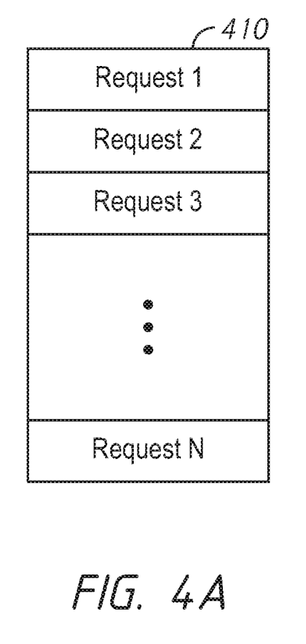
FIG. 4A is a block diagram of an object storing a portion of data for multiple requests in accordance with some implementations.
Figure 4B:
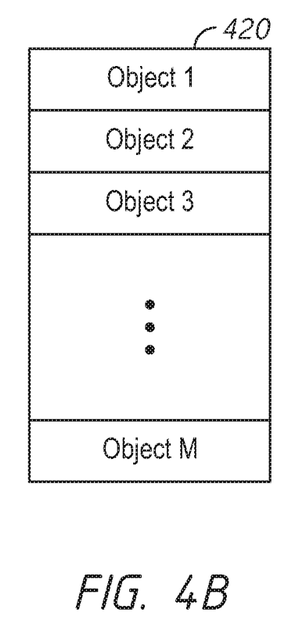
FIG. 4B is a block diagram of an object storing multiple portions of data for a single request in accordance with some implementations.

In some implementations, as shown in FIG. 4A, for each object published in a source namespace, the object store generates an object 410 (e.g., in the storage device 330) including multiple copies of the published object corresponding to multiple subscription namespaces, each of the multiple copies associated with a request ID in metadata stored in the object store 130. In some implementations, as shown in FIG. 4B, for each subscription to a source namespace, the object store 130 generates an object 420 associated with a request ID in metadata stored in the object store 130 (e.g., in the storage device 300). The object 420 includes each of the objects published in the source namespace.

In some implementations, the object store 130 can also be configured to generate a single common copy in response to multiple subscription requests to a source namespace received via the API. The object store 130 can store metadata associating the request IDs of the multiple subscription requests to the common copy (or portions thereof).

The API 325 can also be configured to receive read requests and list requests. In response to a read request, the object store 130 can return requested data. In some implementations, the read request can include a request ID. Thus, the object store 130 can return, in response to the read request, the stored data associated with the request ID indicated by the read request. In some implementations, the read request further includes portion data that indicates a portion of the request ID, e.g., a time span or a segment, and the object store 130 returns the requested portion of the data associated with the request ID indicated by the read request.

In response to a list request, the object store 130 can return metadata indicating whether data indicated by the list request is or is not stored in the object store 130. For example, the list request can include a channel ID and temporal data and the object store 130 can return, in response to the list request, metadata indicating whether or not the indicated data is stored in the object store 130. In various implementations, the object store 130 can indicate that the data is or is not stored in a variety of ways. In some implementations, the object store 130 returns a flag indicating that all of the indicated data is stored or less than all of the indicated data is stored. In some implementations, the object store 130 returns a list of all objects of the indicated data that are stored in the object store 130. In some implementations, the object store 130 returns a list of all objects of the indicated data that are not stored in the object store 130. In some implementations, the object store 130 returns a bitmap with a '1' for each object of the indicated data stored and a '0' for each object of the indicated data not stored.

Figure 5:
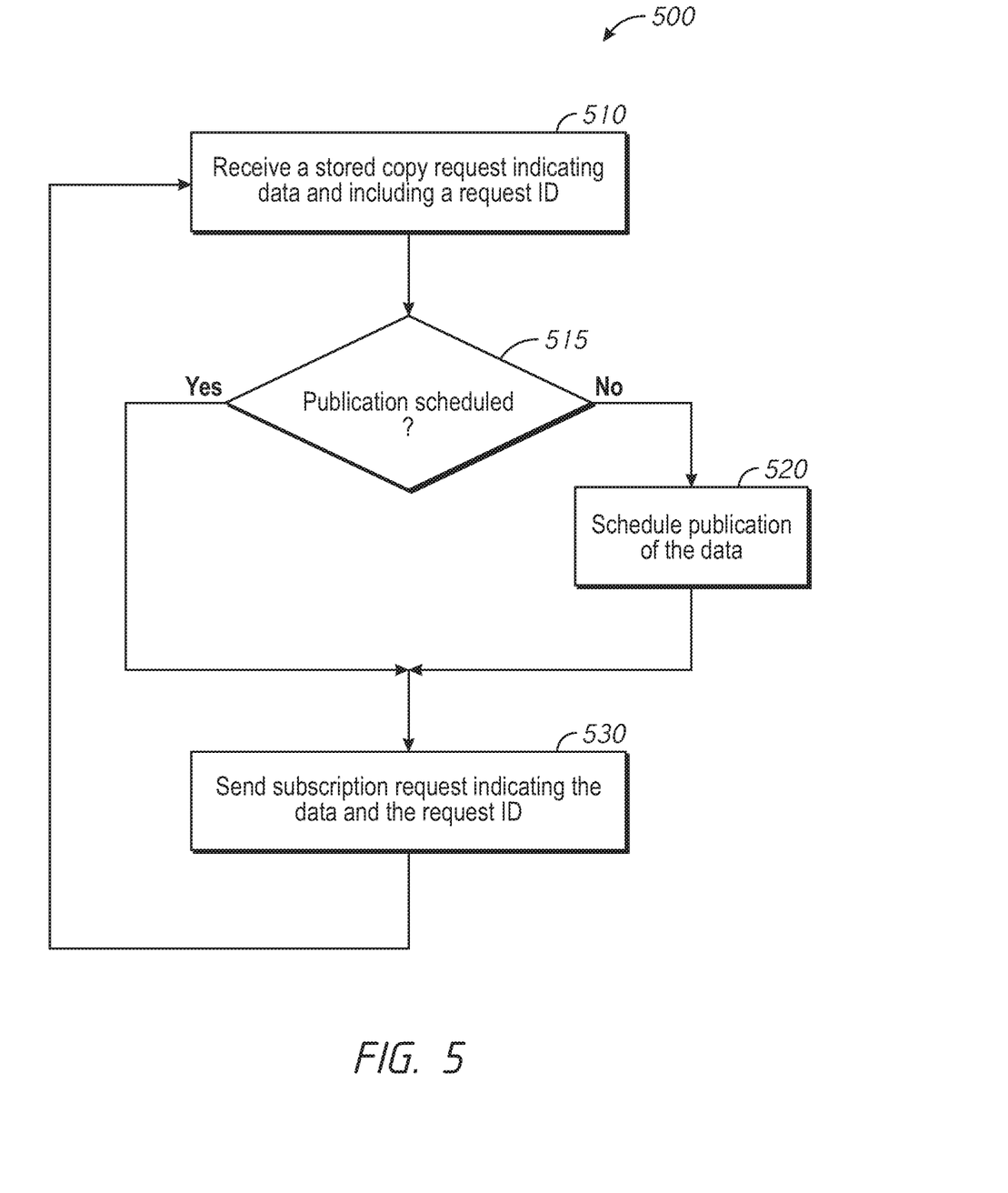
FIG. 5 is a flowchart representation of a method of handling stored copy requests in accordance with some implementations.

FIG. 5 is a flowchart representation of a method of handling stored copy requests in accordance with some implementations. In some implementations (and as detailed below as an example), the method 500 is performed by a recorder module, such as the recorder module 120 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes receiving a stored copy request indicating data to be stored, scheduling publication of the requested data (if not already scheduled), and generating a subscription for the requested data. The method 500 can be performed by the recorder module in response to each of a plurality of stored copy requests. The plurality of stored copy requests can indicate the same data or different data.

The method 500 begins, in block 510, with the recorder module receiving a stored copy request. The stored copy request indicates data for which a copy is to be stored and includes a request ID. In some implementations, the stored copy request is a recording request and indicates a video recording for which a copy is to be stored. For example, the stored copy request can indicate a channel (or sub-channel) and include temporal data indicating a time at which the channel includes the data. In some implementations, the stored copy request can indicate other types of data, such as software updates or digital periodicals (e.g., newspapers, e-zines, or podcasts).

At block 515, the recorder module determines whether publication of the data is scheduled. If publication is not scheduled, the method 500 continues to block 520 where the recorder module schedules publication of the data. In some implementations, scheduling publication of the data includes generating a source namespace in an object store where the copy of the data is to be stored (e.g., by sending a command to the object store to generate the source namespace). In some implementations, scheduling publication of the data includes sending a command to an ingester module to obtain (e.g., receive or retrieve) the data when it is made available.

If the recorder module determines that publication of the data is already scheduled in block 515 (or after publication is scheduled in block 520), the method 500 continues to block 530 where the recorder module sends a subscription request instructing the object store to subscribe a destination namespace associated with the request ID in the object store 130 to the data (e.g., to the source namespace). The subscription request can include the request ID and metadata indicating the data for which a copy is to be stored (e.g., by reference to the source namespace or other identifying information such as a channel identifier and a time span).

In some implementations, the subscription request includes filtering criteria for the data such that only portions of the data meeting the criteria are copied into the destination namespace. The criteria can include, for example, a time range or message index criterion.

Following block 530, the method 500 returns to block 510 where further stored copy requests are received. When the data for which a copy (or copies) of the data are to be stored is received by the recorder module, the recorder module publishes the data, sending the data to the object store for storage in the source namespace. As a result of the subscriptions, copies of the data (or at least portions thereof) are copied by the object store from the source namespace to each of the destination namespaces associated with subscriptions to the data as described further below with respect to FIG. 6.

Figure 6:
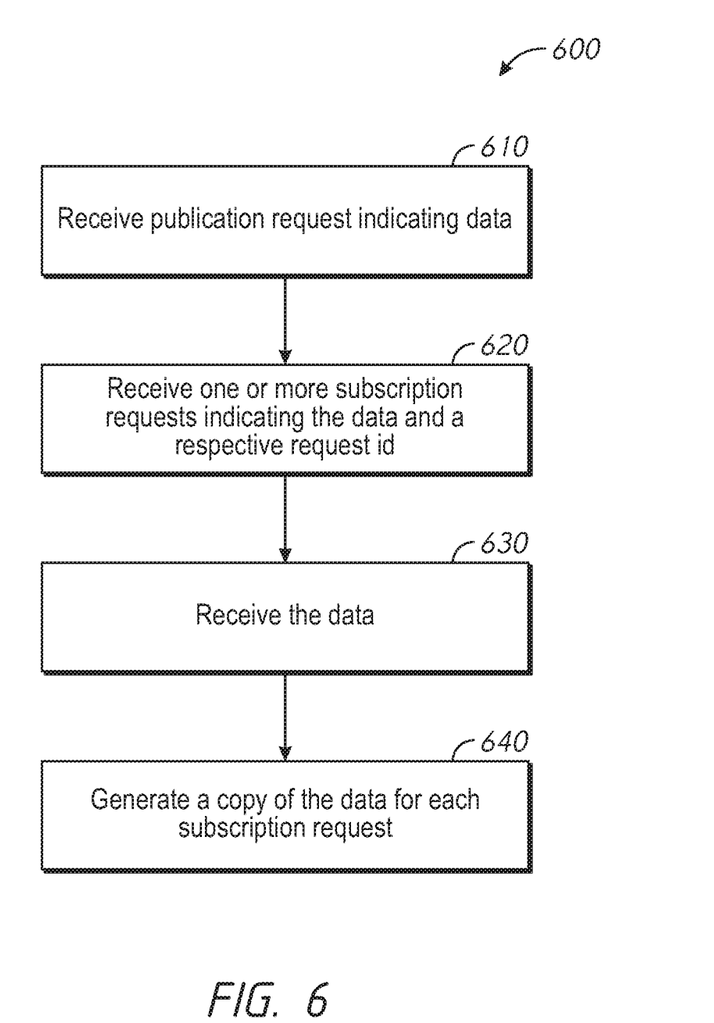
FIG. 6 is a flowchart representation of a method of handling publication requests and subscription requests in accordance with some implementations.

FIG. 6 is a flowchart representation of a method of handling publication requests and subscription requests in accordance with some implementations. In some implementations (and as detailed below as an example), the method 600 is performed by an object store, such as the object store 130 of FIG. 1 or FIG. 3. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes receiving subscription requests and data and, in response, generating copies of the data corresponding to the requests.

The method 600 begins, at block 610, with the object store receiving a publication request indicating data to be copied. In some implementations, the publication request indicates a recording by channel and time. In some implementations, in response to the publication request, the object store creates a source namespace to store the data when it is received.

At block 620, the object store receives one or more subscriptions requests for the data. Each subscription request includes metadata indicating the data and a respective request ID. In some implementations, in response to receiving the one or more subscription requests, the object store creates a respective one or more destination namespaces to store a copy of the data when it is received.

At block 630, the object store receives the data. In some implementations, in response to receiving the data, the object store stores the data in source namespace. At block 640, the object store generates a copy of the data for each subscription request. In some implementations, the object store copies the data from the source namespace to each destination namespace subscribed to the source namespace.

In some implementations, for each object of the data to be copied, the object store generates an object including one or more copies of the published object corresponding to the one or more subscription requests. In some implementations, for each subscription request, the object store generates an object including each of the published objects.

Figure 7:
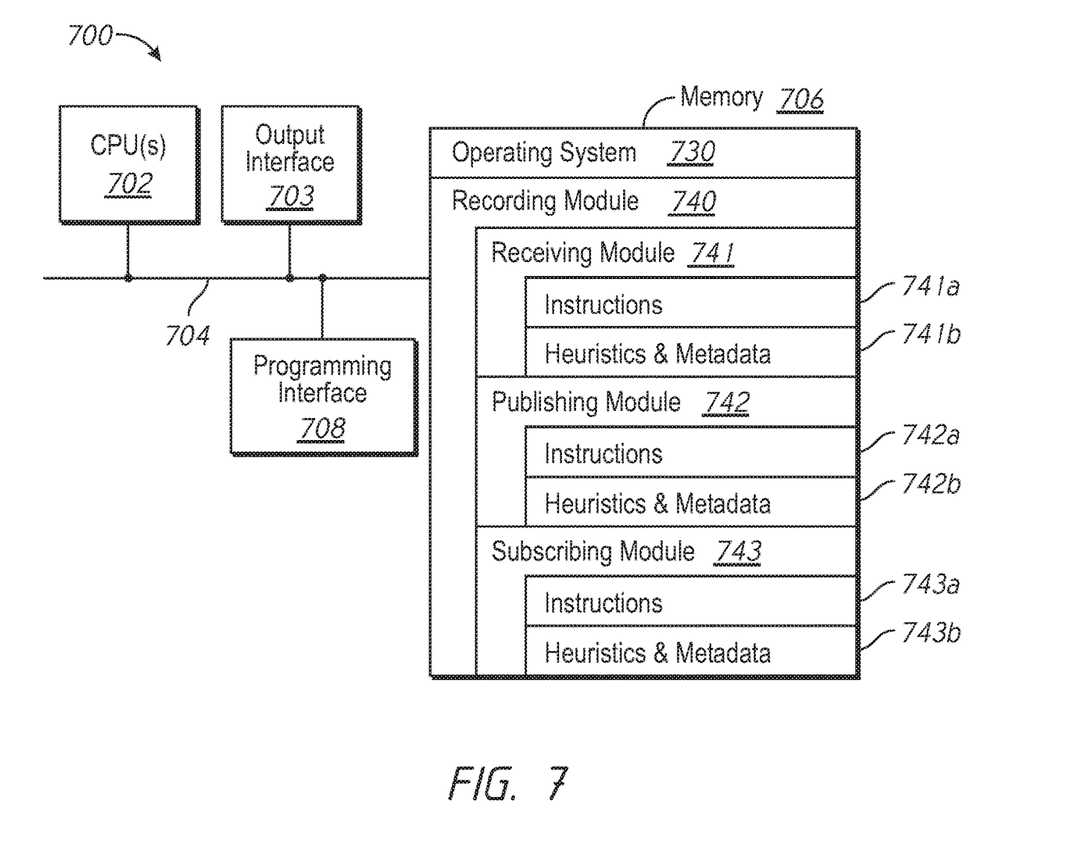
FIG. 7 is a block diagram of a computing device in accordance with some implementations.

FIG. 7 is a block diagram of a computing device 700 in accordance with some implementations. In some implementations, the computing device 700 corresponds to the recorder module 120 of FIG. 1 and performs one or more of the functionalities described above with respect to the recorder module 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703 (e.g., a network interface), a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a recording module 740. In some implementations, one or more instructions are included in a combination of logic and non-transitory memory. The operating system 730 includes procedures for handling various basic system services and for performing hardware dependent tasks. In some implementations, the recording module 740 is configured to publish data and subscribe recording requests to the data. To that end, the recording module 740 includes a receiving module 741, a publishing module 742, and a subscribing module 743.

In some implementations, the receiving module 741 is configured to receive a stored copy request indicating data and including a request identifier. To that end, the receiving module 741 includes a set of instructions 741a and heuristics and metadata 741b. In some implementations, the publishing module 742 is configured to schedule publication of the data to an object store. To that end, the publishing module 742 includes a set of instructions 742a and heuristics and metadata 742b. In some implementations, the subscribing module 743 is configured to send a subscription request indicating the data and the request identifier to the object store. To that end, the subscribing module 743 includes a set of instructions 743a and heuristics and metadata 743b.

In some implementations, the receiving module 741 is further configured to obtain the data and the publishing module 742 is further configured to send the data to the object store.

Although the recording module 740, the receiving module 741, the publishing module 742, and the subscribing module 743 are illustrated as residing on a single computing device 700, it should be understood that in other embodiments, any combination of the recording module 740, the receiving module 741, the publishing module 742, and the subscribing module 743 can reside in separate computing devices in various implementations. For example, in some implementations each of the recording module 740, the receiving module 741, the publishing module 742, and the subscribing module 743 reside on a separate computing device.

Figure 8:
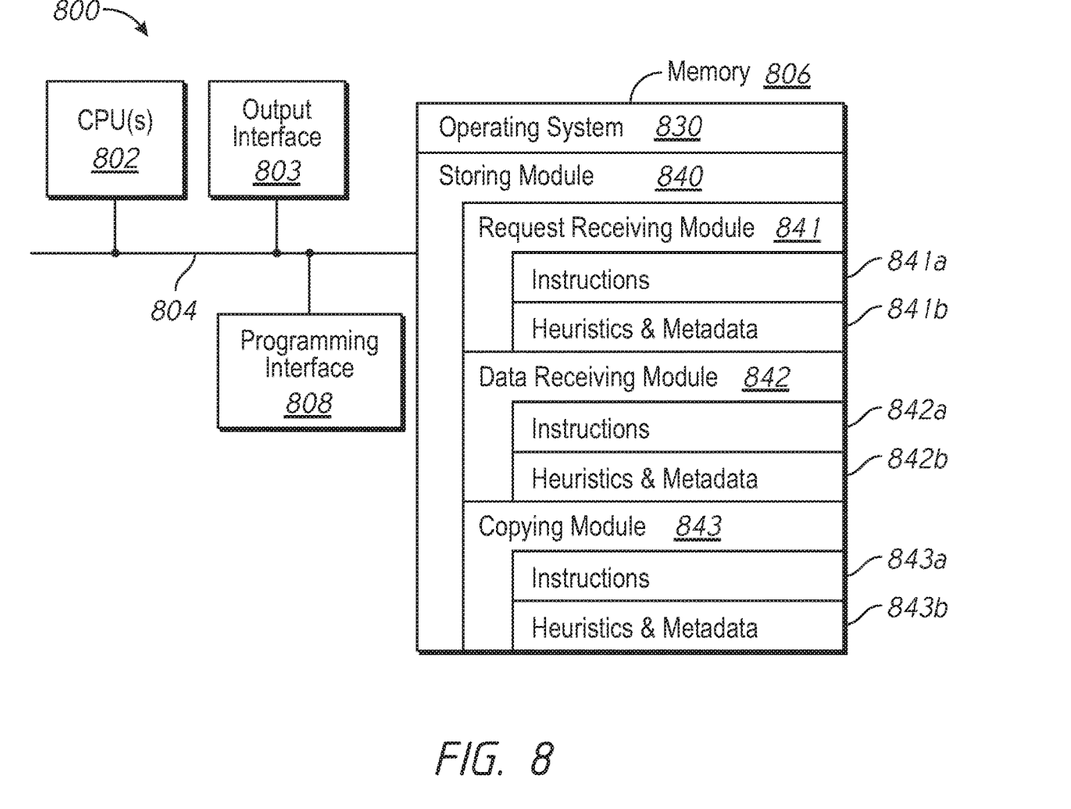
FIG. 8 is a block diagram of another computing device in accordance with some implementations.

FIG. 8 is a block diagram of a computing device 800 in accordance with some implementations. In some implementations, the computing device 800 corresponds to the object store 130 of FIG. 1 or FIG. 3 and performs one or more of the functionalities described above with respect to the object store 130. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 704 for interconnecting these and various other components.

In some implementations, the communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830 and a storing module 840. In some implementations, one or more instructions are included in a combination of logic and non-transitory memory. The operating system 830 includes procedures for handling various basic system services and for performing hardware dependent tasks. In some implementations, the storing module 840 is configured to generate multiple copies of received data. To that end, the storing module 840 includes a request receiving module 841, a data receiving module 842, and a copying module 843.

In some implementations, the request receiving module 841 is configured to receive a publication request indicating data to be copied and one or more subscription request for the data. To that end, the request receiving module 841 includes a set of instructions 841a and heuristics and metadata 841b. In some implementations, the data receiving module 842 is configured to receive the data. To that end, the data receiving module 842 includes a set of instructions 842a and heuristics and metadata 842b. In some implementations, the copying module 843 is configured to generate a copy of the data for each a subscription request. To that end, the copying module 843 includes a set of instructions 843a and heuristics and metadata 843b.

In some implementations, the request receiving module 841 is further configured to, in response to receiving the publication request, create a source namespace to the data when it is received. In some implementations, the request receiving module 841 is further configured to, in response to receiving the one or more subscription requests, create one or more destination namespaces to store a copy of the data when it is received. In some implementations, the data receiving module 842 is further configured to, in response to receiving the data, store the data in the source namespace. In some implementations, the copying module 843 is configured to copy the data from the source namespace to each of the one or more destination namespaces.

Although the storing module 840, the request receiving module 841, the data receiving module 842, and the subscribing module 843 are illustrated as residing on a single computing device 800, it should be understood that in other embodiments, any combination of the storing module 840, the request receiving module 841, the data receiving module 842, and the subscribing module 843 can reside in separate computing devices in various implementations. For example, in some implementations each of the storing module 840, the request receiving module 841, the data receiving module 842, and the subscribing module 843 reside on a separate computing device.

Moreover, FIGS. 7 and 8 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 7 and 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a recorder module in a cloud recording storage system:
receiving, by the recorder module, multiple recording requests from multiple users indicating a channel and a timespan to be recorded;
in response to receiving the multiple recording requests, scheduling, by the recorder module, a publication request indicating data to be copied and instructing, by the recorder module, an object store to create a source namespace in the object store in response to receiving the publication request, wherein the object store in the cloud recording storage system includes a plurality of source namespaces and a plurality of destination namespaces, and
sending, from the recorder module to the object store, multiple subscription requests for the data and instructing the object store to subscribe the plurality of destination namespaces to the source namespace of the plurality of source namespaces; and
triggering the object store to, in response to receiving the multiple subscription requests, create the plurality of destination namespaces to subscribe to the source namespace, publish the data in the source namespace of the plurality of source namespaces upon receiving the data from the recorder module, and generate a unique copy of the published data for each subscription request of the multiple subscription requests, including storing the unique copy of the published data in each of the plurality of destination namespaces with identical object names.

2. The method of claim 1, wherein each of the multiple recording requests is a stored copy request indicating the channel and the timespan and includes a request identifier.

3. The method of claim 1, wherein scheduling the publication request includes determining that publication of the data was previously scheduled.

4. The method of claim 1, wherein scheduling the publication request includes determining that publication of the data was not previously scheduled.

5. The method of claim 4, wherein scheduling the publication request further includes sending, to the object store, a command to generate the source namespace associated with the data.

6. The method of claim 4, wherein scheduling the publication request further includes sending, to an ingester, a command to obtain the data when it is made available.

7. The method of claim 1, wherein a subscription request of the multiple subscription requests includes filtering criteria for the data.

8. The method of claim 1, further comprising:
receiving the data from an ingester in the cloud recording storage system;

in accordance with a determination that the recorder module is publishing the data to the source namespace, sending the data to the object store.

9. The method of claim 8, wherein sending the data to the object store includes publishing the data in the source namespace associated with the data.

10. The method of claim 1, further comprising:
receiving a stored copy request indicating the data, including a request identifier;
determining that publication of the data to the object stored was previously scheduled; and
sending, to the object store, a subscription request indicating the data and the request identifier, wherein the subscription request triggers the object store to subscribe a destination namespace associated with the request identifier in the object store to the source namespace.

11. A cloud recording storage system including a recorder module comprising:
a network interface;
one or more processors; and
a non-transitory memory comprising instructions that when executed cause the one or more processors to perform operations comprising:
receiving, by the recorder module, via the network interface, multiple recording requests from multiple users indicating a channel and a timespan to be recorded;
in response to receiving the multiple recording requests, scheduling, by the recorder module, a publication request indicating data to be copied and instructing, by the recorder module, an object store to create a source namespace in the object store wherein the object store in the cloud recording storage system includes a plurality of source namespaces and a plurality of destination namespaces, and
sending, from the recorder module to the object store, multiple subscription requests for the data and instructing the object store to subscribe the plurality of destination namespaces to the source namespace of the plurality of source namespaces; and
triggering the object store to, in response to receiving the multiple subscription requests, create the plurality of destination namespaces to subscribe to the source namespace, publish the data in the source namespace of the plurality of source namespaces upon receiving the data from the recorder module, and generate a unique copy of the published data for each subscription request of the multiple subscription requests, including storing the unique copy of the published data in each of the plurality of destination namespaces with identical object names.

12. The cloud recording storage system of claim 11, wherein each of the multiple recording requests is a stored copy request indicating the channel and the timespan and includes a request identifier.

13. The cloud recording storage system of claim 11, wherein a subscription request of the multiple subscription requests includes filtering criteria for the data.

14. The cloud recording storage system of claim 11, wherein the operations further comprise publishing the data in the source namespace associated with the data.

15. The cloud recording storage system of claim 11, wherein the operations further comprise:
receiving a stored copy request indicating the data, including a request identifier;
determining that publication of the data to the object stored was previously scheduled; and
sending, to the object store, a subscription request indicating the data and the request identifier, wherein the subscription request triggers the object store to subscribe a destination namespace associated with the request identifier in the object store to the source namespace.

16. A method comprising:
at an object store in a storage system, wherein the object store includes a plurality of source namespaces and a plurality of destination namespaces:
receiving, by the object store, a publication request from a recorder module in the storage system indicating data to be copied, wherein the publication request is scheduled by the recorder module in the storage system in response to receiving multiple recording requests from multiple users indicating a channel and a timespan to be recorded;
creating a source namespace in response to receiving the publication request from the recorder module;
receiving from the recorder module multiple subscription requests for the data, wherein the multiple subscription requests for the data are sent by the recorder module in response to receiving the multiple recorder requests, instructing the object store to subscribe the plurality of destination namespaces to the source namespace of the plurality of source namespaces;
creating the plurality of destination namespaces to subscribe to the source namespace in response to receiving the multiple subscription requests from the recorder module;
publishing the data in the source namespace of the plurality of source namespaces upon receiving the data from the recorder module; and
generating, by the object store, a unique copy of the published data for each subscription request of the multiple subscription requests, including storing the unique copy of the published data in each of the plurality of destination namespaces with identical object names.

17. The method of claim 16, further comprising:
in response to receiving the data, storing the data in the source namespace.

18. The method of claim 17, wherein generating, by the object store, the unique copy of the published data for each subscription request of the multiple subscription requests includes copying the published data from the source namespace to each of the plurality of destination namespaces.

19. The method of claim 16, wherein generating, by the object store, the unique copy of the published data for each subscription request of the multiple subscription requests includes generating, for each object of the published data, an object including multiple copies of the object of the published data.

20. The method of claim 16, wherein generating, by the object store, the unique copy of the published data for each subscription request of the multiple subscription requests includes generating, for each subscription request of the multiple subscription requests, an object including each object of the published data.

* * * * *